United States Patent [19]

Kress et al.

[11] Patent Number: 4,812,515

[45] Date of Patent: Mar. 14, 1989

[54] AGEING-RESISTANT THERMOPLASTIC MOULDING MATERIALS OF GOOD IMPACT STRENGTH

[75] Inventors: Hans-Jürgen Kress, Pittsburgh, Pa.; Christian Lindner; Wolfgang Grape, both of Cologne, Fed. Rep. of Germany; Horst Peters, Leverkusen, Fed. Rep. of Germany; Jochen Schoeps; Dieter Wittmann, both of Krefeld, Fed. Rep. of Germany

[73] Assignee: Bayer Aktiengesellschaft, Leverkusen, Fed. Rep. of Germany

[21] Appl. No.: 97,550

[22] Filed: Sep. 16, 1987

[30] Foreign Application Priority Data

Sep. 17, 1986 [DE] Fed. Rep. of Germany ....... 3631539

[51] Int. Cl.$^4$ .................................................. C08F 8/00
[52] U.S. Cl. ........................................ 525/69; 525/63; 525/92; 525/479; 525/902
[58] Field of Search ..................... 525/63, 64, 67, 902, 525/464, 479, 92, 69; 523/201

[56] References Cited

U.S. PATENT DOCUMENTS

| | | | |
|---|---|---|---|
| 4,028,433 | 6/1977 | Prinz et al. | 525/67 |
| 4,082,895 | 4/1978 | Backdert et al. | 525/67 |
| 4,205,141 | 5/1980 | Liebig et al. | 525/67 |
| 4,461,868 | 7/1984 | Linder et al. | 525/67 |
| 4,605,699 | 8/1966 | Mitulla et al. | 525/67 |
| 4,665,125 | 5/1987 | Kishida et al. | 525/67 |
| 4,683,265 | 7/1987 | Kress et al. | 525/67 |
| 4,740,554 | 4/1988 | Kress et al. | 525/67 |
| 4,764,555 | 8/1988 | Shigemitsu | 525/67 |

FOREIGN PATENT DOCUMENTS

| | | | |
|---|---|---|---|
| 0111260 | 6/1984 | European Pat. Off. | 525/67 |
| 2818679 | 10/1979 | Fed. Rep. of Germany | 525/67 |
| 1026646 | 2/1986 | Japan | 525/902 |

*Primary Examiner*—John C. Bleutge
*Assistant Examiner*—R. Dean, Jr.
*Attorney, Agent, or Firm*—Connolly and Hutz

[57] ABSTRACT

Silicone rubbers in the form of crosslinked, particulate particles can be used as a grafting base for the preparation of thermoplastic moulding materials having good low-temperature impact strength and resistance to weathering-ageing, after they are provided with an intermediate shell of crosslinked acrylate rubber.

4 Claims, No Drawings

AGEING-RESISTANT THERMOPLASTIC MOULDING MATERIALS OF GOOD IMPACT STRENGTH

Mixtures of polycarbonates with mixtures of graft polymers of vinyl monomers on rubbers and of thermoplastic copolymers formed from vinyl monomers are disclosed, for example, in German Auslegeschrift No. 1,170,141, German Offenlegungsschrift No. 3,336,369, German Auslegeschrift No. 2,259,565 and European Pat. No. 5202.

Moulding materials based on polydiorganosiloxane/-polycarbonate block copolymers and ABS polymers are disclosed in European Pat. No. 135,794.

Because of the butadiene present in the ABS, the resistance to ageing and weathering of these moulding materials is not satisfactory, so that they have only a limited suitability for outdoors.

If the oxidation-sensitive diene rubber is replaced by an alkyl acrylate rubber, the impact strength and the appearance of the mouldings are not satisfactory. For good physical properties, the acrylic ester rubbers employed instead of the diene rubber must be crosslinked. Appropriate moulding materials are described in, for example, British Pat. No. 1,293,973, German Offenlegungsschrift No. 2,259,564, U.S. Pat. No. 3,655,824 and U.S. Pat. No. 4,148,842. The impact strength of these moulding materials, particularly at low temperatures, is also not adequate for many applications, for example for automobile parts.

Silicone rubbers, on the other hand, have very good low-temperature properties and resistance to weathering. However, it is difficult to graft them with resin-forming monomers. Appropriate graft polymers are described in, for example, German Offenlegungsschrift No. 2,539,572 and Offenlegungsschrift No. 2,421,288.

Mixtures composed of polycarbonate, ABS and small amounts of an organosilicon compound, in particular polydimethylsiloxane, are described in European Pat. No. 22,979 and in U.S. Pat. No. 4,305,856.

Mixtures of thermoplastic, partly crystalline plastics, for example polycarbonate with graft copolymers composed of monomers compatible with these plastics and of an optionally modified organopolysiloxane, are described in German Offenlegungsschrift No. 2,659,357. Particularly advantageous results are obtained if the starting material used in the preparation of the graft copolymers are organopolyisolanes containing groups which can be attacked by free radicals, which are capable of hydrogen or halogen transfer, and/or contain acrylic or methacrylic groups as side chains.

It has been found that silicone rubbers in crosslinked, particulate form, can be used as grafting bases for the preparation of thermoplastic moulding materials of good low-temperature impact strength and resistance to weathering/ageing, after they are provided with an intermediate shell of crosslinked acrylate rubber.

The invention relates to thermoplastic moulding materials containing:

A. 5 to 98 parts by weight, preferably 20 to 95 parts by weight, of one or more thermoplastic polycarbonates,
B. 2 to 70 parts by weight, preferably 5 to 60 parts by weight, of one or more graft polymers of
B.1 5 to 90 parts by weight, preferably 30 to 80 parts by weight, of a mixture composed of
B.1.1 50 to 95 parts by weight of styrene, α-methylstyrene, styrene substituted in the nucleus, methyl methacrylate or mixtures thereof, and
B.1.2 50 to 5 parts by weight of acrylonitrile, methacrylonitrile, methyl methacrylate, maleic anhydride, N-substituted maleimide or mixtures thereof, grafted onto
B.2 95 to 10 parts by weight, preferably 70 to 20 parts by weight, of a rubber having a core/sheath structure and consisting of a core (a.) constituting a crosslinked silicone rubber, and of a shell (b.) constituting a crosslinked alkyl acrylate rubber, the ratio by weight of the core (a.) to the shell (b.) being 0.1:99.9 to 90:10, preferably 10:90 to 50:50, and having an average particle diameter ($d_{50}$) of 0.05 to 10 μm, preferably 0.1 to 2 μm and particularly preferably 0.1 to 1 μm, and
C. 0 to 80 parts by weight, preferably 0 to 70 parts by weight, of a thermoplastic copolymer formed from
C.1 50 to 95 parts by weight of styrene, α-methylstyrene, styrene substituted in the nucleus, methyl methacrylate or mixtures thereof, and
C.2 50 to 5 parts by weight of (meth)acrylonitrile, methyl methacrylate, maleic anhydride, N-substituted maleimide or mixtures thereof.

The moulding materials according to the invention are distinguished by good surface properties, good impact strength, even at low temperatures, and good resistance to ageing/weathering.

Thermoplastic, aromatic polycarbonates A are those based on diphenols of the formula (I)

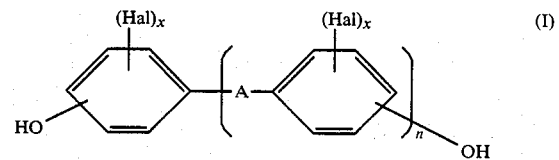

wherein A is a single bond, $C_1$–$C_5$-alkylene, $C_2$–$C_5$-alkylidene, $C_5$–$C_6$-cycloalkylidene, —S— or —$SO_2$—, Hal is chlorine or bromine, x is 0, 1 or 2 and n is 1 or 0, optionally together with diphenols of the formula (Ia)

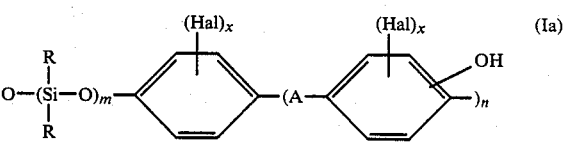

wherein A, Hal, x and n have the meaning mentioned for formula (I), and the radicals R are identical or different and are linear $C_1$–$C_{20}$-alkyl, branched $C_3$–$C_{20}$-alkyl or $C_6$–$C_{20}$-aryl, preferably $CH_3$, and m is an integer from 5 to 100, preferably from 20 to 80.

Polycarbonates A are homopolycarbonates of diphenols of the formula (I) and copolycarbonates of diphenols of the formula (I) together with diphenols of the formula (Ia) the amount of which is 1 to 20% by weight, preferably 1.5 to 15% by weight and, in particular, 2 to 10% by weight, relative in each case to the total weight of the diphenols employed. These products are also termed polydiorganosiloxane/polycarbonate block copolymers.

Polycarbonates A are also mixtures composed of a copolycarbonate formed from the diphenols of the formulae (Ia) and (I) and of another siloxane-free, thermoplastic polycarbonate, the content of diphenols of the formula (Ia) in the thermocarbonate mixture being 1 to 20% by weight, relative to the total sum of diphenols.

Polycarbonates A are known. They can be prepared, for example, from diphenols and phosgene by the phase boundary process or in a homogeneous phase ("pyridine process"), the molecular weight being adjusted by means of an appropriate amount of known chain terminators (for polycarbonates containing polydiorganosiloxanes see German Offenlegungsschrift No. 3,334,872.

Examples of suitable chain terminators are phenol, p-chlorophenol, p-tert.-butylphenol, 2,4,6-tribromophenol and long-chain alkylphenols, such as 4-(1,3-tetramethylbutyl)-phenol (c.f. German Offenlegungsschrift No. 2,842,005) and also a monoalkylphenol and dialkylphenols having a total of 8 to 20 C atoms in the alkyl substituents (c.f. German Offenlegungsschrift No. 3,506,472.2), such as 3,6-di-tert.-butylphenol, p-isooctylphenol, p-tert.-octylphenol, p-dodecylphenol, 2-(3,5-dimethylheptyl)-phenol and 4-(3,5-dimethylheptyl)-phenol.

The polycarbonates A have mean weight average molecular weights ($\overline{M}w$, measured, for example, by ultracentrifugation or light scattering measurements) of 10,000 to 200,000, preferably 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Particularly suitable diphenols of the formula (Ia) are those in which R is $C_1$-$C_4$-alkyl, such as methyl, ethyl, propyl, n-butyl or tert.-butyl, or is phenyl.

Preferred diphenols of the formula (Ia) correspond to the formula (Ib)

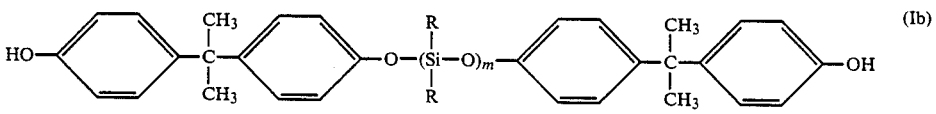

(Ib)

wherein the radicals R are identical and denote $C_1$-$C_4$-alkyl, preferably methyl, or phenyl and m is an integer between 5 and 100, preferably between 20 and 80.

The diphenols of the formula (Ia) can be prepared, for example, from the corresponding bis-chloro compounds of the formula (II)

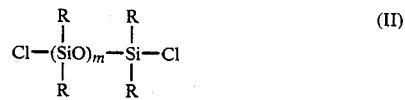

(II)

and the diphenols of the formula (I) in accordance with U.S. Pat. No. 3,419,634, column 3, in combination with U.S. Pat. No. 3,189,662.

In the bis-chloro compounds (II), R and m have the same meaning as in the diphenols (Ia) and (Ib).

The polycarbonates A can be branched, preferably by the incorporation of 0.05 to 2.0 mol%, relative to the sum of the diphenols employed, of compounds which have three or more functions, for example compounds containing three or more than three phenolic groups.

In addition to bisphenol A homopolycarbonate, preferred polycarbonates are the copolycarbonates of bisphenol A containing up to 15 mol%, relative to the molar totals of diphenols, of 2,2-bis-(3,5-dibromo-4-hydroxyphenyl)-propane or the copolycarbonates of the diphenols of the formula (I) containing 1 to 20% by weight of diphenols of the formula (Ia), preferably of the formula (Ib), relative in each case to the total weight of the diphenols (I) and (Ia) or (I) and (Ib), respectively.

The rubbers which are suitable for the preparation of the graft polymers B have a core/shell structure composed of a core a. which constitutes crosslinked silicone rubber and a shell b. which constitutes a crosslinked alkyl acrylate rubber. The ratio by weight of the core a. to the shell b. is 0.1:99.9 to 90:10, preferably 10:90 to 50:50. The rubbers and the graft polymers according to the invention have average particle diameters ($d_{50}$) of 0.05 to 10 μm, preferably 0.1 to 2 μm and particularly preferably 0.1 to 1 μm.

The material of the core a. is a crosslinked silicone rubber composed of units of the general formulae

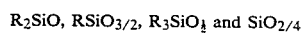

wherein R represents a monovalent radical.

The amounts of the individual siloxane units are in this case such that there are 0 to 10 molar units of the formula $RSiO_{3/2}$, 0 to 1.5 molar units of $R_3SiO_{\frac{1}{2}}$ and 0 to 3 molar units of the formula $SiO_2$ present per 100 units of the formula $R_2SiO$.

In this regard, R can be either a monovalent, saturated hydrocarbon radical having 1 to 18 carbon atoms, the phenyl radical or the alkoxy radical or a group which can be attacked by free radicals, such as the vinyl or mercaptopropyl radical. It is preferable that at least 80% of all the radicals R should be methyl; combinations of methyl and ethyl are especially preferred.

Preferred silicone rubbers a. contain incorporated units of groups which can be attacked by free radicals, in particular vinyl, allyl, halogen or mercapto groups, preferably in amounts of 2 to 10 mol%, relative to all the radicals R.

The shell b. constitutes a crosslinked acrylate rubber and is, in particular, a crosslinked polymer formed from alkyl acrylates, if appropriate mixed with up to 40% by weight of other vinyl monomers. The suitable, polymerizable acrylic acid esters include $C_1$-$C_8$-alkyl esters, for example methyl, ethyl, butyl, octyl and 2-ethylhexyl esters, halogenoalkyl esters, preferably $C_1$-$C_8$-halogenoalkyl esters, such as chloroethyl acrylate, and aromatic esters, such as benzyl acrylate and phenethyl acrylate. They can be employed on their own or as a mixture, in which case at least one alkyl ester should be present in the mixture. In order to achieve crosslinking, polyfunctional monomers are copolymerized. The following are examples: esters of unsaturated carboxylic acids with a polyol (preferably 2 to 20 carbon atoms in the ester group), such as ethylene glycol dimethacrylate, esters of a polybasic carboxylic acid with an unsaturated alcohol (preferably 8 to 30 carbon atoms in the ester radical), such as triallyl cyanurate or triallyl isocyanurate; divinyl compounds, such as divinylbenzene; esters of an unsaturated carboxylic acid with unsaturated alcohols (preferably 6 to 12 carbon atoms in the ester radical), such as allyl methacrylate, phosphoric acid esters, for example triallyl phosphate, and 1,3,5-triacryloylhexahydro-s-triazine. Polyfunctional monomers which are particularly preferred are triallyl cyanurate, triallyl isocyanurate, triallyl phosphate and allyl methacrylate.

The amount of the polyfunctional monomers used for crosslinking is preferably 0.05 to 5.0% by weight of the weight of the first shell b. The elastomer of the first shell b. can, in addition, also contain, copolymerized, a copolymerizable monomer or several such monomers of the vinyl or vinylidene type. The following are examples: methyl methacrylate, butyl acrylate, acrylonitrile, styrene, methylstyrene, acrylamides or vinyl alkyl ethers. These comonomers can be copolymerized in amounts up to 40% by weight of the polymer b.

The graft polymers B are then prepared by freeradical graft polymerization of the monomer mixtures, defined initially, of B.1.1 and B.1.2 in the presence of the rubbers B.2.

Halogenostyrenes and p-methylstyrene are to be mentioned as styrenes substituted in the nucleus.

The graft polymers according to the invention can be prepared in an aqueous emulsion as follows: the silicone rubber, that is to say the core a., is first prepared in an initial stage by emulsion polymerization of a silicone oligomer:

Those skilled in the art are familiar in principle with the preparation of an emulsion of a long-chain, OH-terminated silicone oil by emulsion polymerization. Reference is made in this context, for example, to U.S. Pat. No. 2,891,910 and to British patent specification No. 1,024,024. The process disclosed in the British Patent Specification, of employing an alkylbenzenesulphonic acid, is particularly preferred, since in this case the emulsifier and the polymerization catalyst are present in one molecule. When the polymerization is complete, the acid is neutralized.

Accordingly, it is possible to keep the concentration of emulsifier low, and not many interfering extraneous molecules from the catalyst are present in the finished product after the emulsion has been prepared. However, it is also possible to employ n-alkylsulphonic acids instead of the alkylbenzenesulphonic acids mentioned. In addition to the catalytically active sulphonic acid, it is also possible to employ, in addition, other emulsifiers as co-emulsifiers.

Co-emulsifiers of this type can be of a nonionic or anionic nature. Suitable anionic co-emulsifiers are, in particular, salts of the abovementioned n-alkylsulphonic or alkylbenzenesulphonic acids. Nonionic co-emulsifiers are polyoxyethylene derivatives of fatty alcohols, fatty acids and the like. Examples of emulsifiers of this type are POE (3)-lauryl alcohol, POE (20)-oleyl alcohol, POE (7)-nonylphenol or POE (10)-stearate (the notation POE (3)-lauryl alcohol means that 3 units of ethylene oxide have been added on to one molecule of lauryl alcohol, the number 3 representing an average value).

In general, silicone oils which have been formed by emulsion polymerization in the presence of nonionic co-emulsifiers have a lower molecular weight than silicone oils in which no co-emulsifier has been used. The molecular weight of the OH-terminated silicone oil formed in the course of the emulsion polymerization can be adjusted via the temperature in the course of establishing the equilibrium between siloxane, water and the silanol initially formed by ring-opening of the siloxane. (For details relating to the correlation between temperature and molecular weight, reference should be made to the paper by D. R. Weyenberg et al, J. Polymer Sci. Part C, 27 pp 27–34 (1969)).

The groups which can be attacked by free radicals can be introduced into the preferred silicone polymer by carrying out the reaction in the presence of suitable siloxane oligomers. Examples of suitable starting oligomers are tetramethyltetravinylcyclotetrasiloxane or mercaptopropylmethyldimethoxysilane or the hydrolysate of the latter.

These functional oligomers are added to the base oligomer octamethylcyclotetrasiloxane in the desired amounts.

The incorporation of alkyl radicals R having a longer chain, such as, for example, ethyl or propyl, and the incorporation of phenyl groups can also be achieved analogously.

The silicone grafting base must be at least partly crosslinked.

Adequate crosslinking can be achieved merely by reacting with one another, in the course of the emulsion polymerization of the silicone constituents, the vinyl and mercaptopropyl groups which are preferably employed, so that the addition of an external crosslinking agent can be unnecessary. A silane which effects crosslinking can, however, be added, in order to increase the degree of crosslinking of the silicone rubber.

Branching or crosslinking can be produced by adding, for example, tetraethoxysilane or a silane of the general formula $RSiX_3$ wherein X represents a hydrolysable group, in particular the alkoxy radical. R has the meaning described in the preceding text. Preferably, R is methyl and R is phenyl. In addition to tetraethoxysilane, methyltrimethoxysilane or phenyltrimethoxysilane are especially preferred.

The rubber B.2 can be prepared by producing, by emulsion polymerization, the acrylate rubber for the shell b. in the presence of the silicone rubber latex, by emulsifying the acrylate monomers in the silicone rubber latex and carrying out polymerization in the manner which is in itself known using initiators which form free radicals. The acrylate rubber polymerizes onto the silicone rubber and forms a shell around the silicone rubber particles. It can be crosslinked as early as the preparation stage by concomitantly using polyfunctional monomers.

In the graft polymerization of the shell b., the formation of new particles must be prevented as completely as possible. An emulsion stabilizer must be present in the amount required to cover the surface of the particles. The size of these particles can be varied within wide limits by the manner in which the reaction is carried out.

When the graft polymerization of the acrylate rubber is complete, a vinyl monomer or a mixture of vinyl monomers is polymerized in emulsion onto the resulting rubber latex B.2. The graft polymers B are then formed by the development of a graft shell composed of the polymer of the resin-forming vinyl monomers. In this graft polymerization, which is in itself known and which is customarily carried out in the presence of free-radical initiators, for example water-soluble initiators, emulsifiers or complex-formers/graft activators, and also regulators, free polymers or copolymers of the monomers forming the resin shell are generally formed to a certain extent as well as the graft polymer. The amount of this non-grafted polymer can be characterized by the degree of grafting or the graft yield; it depends on the polymerization conditions, the composition of the shell b., the size of the particles to be grafted and the amount of grafted acrylate rubber. "Graft polymer" within the meaning of the invention is, therefore, the product obtained by polymerization of vinyl monomers in the presence of the rubber latex, strictly speaking, therefore, a mixture of graft polymer and free copolymer of the graft monomers.

The graft polymers thus prepared can be processed by known processes, for example by coagulating the latices with electrolytes (salts, acids or mixtures thereof), followed by purification and drying.

Preferred copolymers C are those formed from at least one monomer belonging to the series comprising styrene, α-methylstyrene or nuclear-substituted styrene according to C.1 together with at least one monomer from the series comprising acrylonitrile, methacrylonitrile, methyl methacrylate, maleic anhydride and N-substituted maleimide according to C.2.

Copolymers C are frequently formed as byproducts in the course of the graft polymerization in order to prepare the component B, particularly when large amounts of monomers are grafted onto small amounts of rubber.

The amount of copolymer C to be employed in accordance with the invention, 0 to 80 parts by weight, relative to 100 parts by weight of A+B+C, does not include these byproducts of the graft polymerization.

The copolymers C are resinous, thermoplastic and rubber-free. Copolymers C which are particularly preferred are those formed from styrene and/or α-methylstyrene together with acrylonitrile and, if appropriate, methyl methacrylate.

Particularly preferred ratios by weight in the thermoplastic copolymer C are 60 to 80% by weight of C.1 and 40 to 20% by weight of C.2.

The copolymers C are known and can be prepared by free-radical polymerization, in particular by emulsion, suspension, solution or mass polymerization. They preferably have molecular weights $\overline{M}w$ (weight average, determined by light scattering or sedimentation) between 15,000 and 200,000.

The moulding materials according to the invention can contain further additives known for polycarbonates, graft polymers or thermoplastic copolymers, such as stabilizers, pigments, mould release agents, flame-retarding agents and antistatic agents, in the customary amounts.

The moulding materials according to the invention, containing the components A, B, if appropriate C and, if appropriate, further additives, such as stabilizers, pigments, mould release agents, flame-retarding agents and/or antistatic agents, can be prepared by mixing the ingredients in a known manner and melt-compounding or melt-extruding them at temperatures from 200° to 330° C. in customary devices, such as internal kneaders, extruders or twin screw extruders.

The present invention also relates, therefore, to a process for the preparation of thermoplastic moulding materials containing the components A, B, if appropriate C and, if appropriate, stabilizers, pigments, mould release agents, flame-retarding agents and/or antistatic agents, which is characterized in that the components are mixed and are then melt-compounded or melt-extruded at temperatures from 200° to 330° C. in customary devices.

The ingredients can be mixed separately or simultaneously at about 20° C. (room temperature) up to about 100° C.

The moulding materials of the invention can be used for the preparation of mouldings of every kind. In particular, mouldings can be prepared by injection mouldings. The following are examples of mouldings: casing components (for example for household equipment, such as juice squeezers, coffee machines or mixers), covering panels for buildings and automobile components. They are also employed for electrical equipment, for example terminal strips, because they have very good electrical properties.

Mouldings can also be prepared by deep drawing from previously prepared panels or sheets.

Particle size always denotes average particle diameter, $d_{50}$, determined by ultracentrifuge measurements by the method of W. Scholten et al., Kolloid-Z. u. Z. Polymere 250 (1972), 782–796.

EXAMPLES

Polycarbonates and copolymers

A. Linear polycarbonate based on bisphenol A having a relative solution viscosity $\eta_{rel}$ of 1.26–1.28, measured in $CH_2Cl_2$ at 25° C. and in a concentration of 0.5 g/100 ml.

C. Styrene/acrylonitrile copolymer having a styrene/acrylonitrile ratio of 72:28 and a limiting viscosity of $(\eta)=0.55$ dl/g (measured in dimethylformamide at 20° C.).

Preparation of the graft polymer B according to the invention

1. Preparation of a silicone rubber emulsion 1.1. 38.4 parts by weight of octamethylcyclotetrasiloxane, 1.2 parts by weight of tetramethyltetravinylcyclotetrasiloxane and 0.2 parts by weight of tetraethoxysilane are stirred together.

0.5 part of dodecylbenzenesulphonic acid is added, and 70 parts by weight of water are then added in the course of 1 hour. The mixture is vigorously stirred meanwhile. The preliminary emulsion is homogenized twice at 200 bar using a high-pressure emulsifying machine. A further 0.5 part by weight of dodecylbenzenesulphonic acid is added.

The emulsion is stirred for 2 hours at 85° C. and then for 36 hours at room temperature. It is neutralized by means of 5N NaOH. This gives a stable emulsion having a solids content of approximately 36%. The polymer has a gel content of 82% by weight, measured in toluene.

2. Preparation of a silicone rubber encased (grafted) with acrylate rubber 2.1. The following are initially placed in a reactor: 2,500 parts by weight of latex 1.1 and 228 parts by weight of water.

A solution of 3 parts by weight of potassium peroxodisulphate in 100 parts by weight of water is introduced into the reactor at 70° C.

The following solutions are then metered into the reactor at 70° C. in the course of 5 hours:

Solution 1: 387 parts by weight of n-butyl acrylate and 1 part by weight of triallyl cyanurate Solution 2: 500 parts by weight of water and 10 parts by weight of the Na salt of $C_{14}$–$C_{18}$-alkylsulphonic acids.

Polymerization is then carried out to completion at 70° C. in 4 hours. The resulting latex contains the polymer in a concentration of 35% by weight. The polymer has a gel content of 92% by weight, measured in toluene, and consists of 70% by weight of silicone rubber and 30% by weight of acrylate rubber.

3. Graft polymer B according to the invention

The following are initially placed in a reactor;
3,700 parts by weight of latex 2.1 and
770 parts by weight of water.

After initiating the reaction by means of a solution of 3.5 parts by weight of potassium peroxodisulphate in 150 parts by weight of water at 70° C., the following solutions are fed into the reactor at a uniform rate in the course of 5 hours:

Solution 1:
855 parts by weight of monomer
(616 parts by weight of styrene and
239 parts by weight of acrylonitrile)

Solution 2:
1,000 parts by weight of water and
30 parts by weight of the Na salt of $C_{14}$–$C_{18}$-alkylsulphonic acids.

Polymerization is then carried out to completion at 70°–75° C. in 4 hours. This gives latices having a solids content of approximately 33% by weight. Comparison graft polymer B'.

An ASA graft polymer composed of 60% by weight of coarsely particulate, highly crosslinked acrylate rubber and 40% by weight of a styrene/acrylonitrile mixture in a ratio by weight of 72:28, having an average particle size ($d_{50}$) of approximately 400 nm. The product was prepared in accordance with EP No. 34,748.

Preparation of the moulding materials according to the invention

The components A, B and C were compounded at temperatures of 200°–220° C. in a 3-1 internal kneader.

The mouldings were prepared on an injection moulding machine at 260° C.

The notched impact strength was measured by the Izod method on bars of dimensions 2.5×½×⅛″ as specified in ASTM-D-256.

The results are shown in Table 1.

TABLE 1

| % by weight | | | | Notched impact strength (J/m) | | |
|---|---|---|---|---|---|---|
| A | B | B' | C | Room temperature | −20° C. | −50° C. |
| according to the invention | | | | | | |
| 60 | 24 | | 16 | 612 | 443 | 364 |
| comparison | | | | | | |
| 60 | | 20 | 20 | 620 | 287 | |

What is claimed is:

1. Thermoplastic moulding materials containing:
   A. 5 to 98 parts by weight, of one or more thermoplastic polycarbonates,
   B. 2 to 70 parts parts by weight, of one or more graft polymers of
   B.1 5 to 90 parts by weight, of a mixture composed of
   B.1.1 50 to 95 parts by weight of styrene, α-methylstyrene, styrene substituted in the nucleus, methyl methacrylate or mixtures thereof, and
   B.1.2 50 to 5 parts by weight of acrylonitrile, methacrylonitrile, maleic anhydride, N-substituted maleimide or mixtures thereof, grafted onto
   B.2 95 to 10 parts by weight, of a rubber having a core/shell structure and consisting of a core a. constituting a crosslinked silicone rubber, and of a shell b. constituting a crosslinked alkyl acrylate rubber, the ratio by weight of the core having an average particle diameter ($d_{50}$) of 0.05 to 10 μm, and
   C. 0 to 80 parts by weight, of a thermoplastic copolymer formed from
   C.1 50 to 95 parts by weight of styrene, α-methylstyrene, styrene substituted in the nucleus, methyl methacrylate or mixtures thereof, and
   C.2 50 to 5 parts by weight of acrylonitrile, methacrylonitrile, maleic anhydride, N-substituted maleimide or mixtures thereof.

2. Moulding materials according to claim 1, wherein A is a polydiorganosiloxane/polycarbonate block copolymer.

3. Moulding materials according to claim 1, wherein A is a mixture of a bisphenol A polycarbonate and a polydiorganosiloxane/polycarbonate block copolymer.

4. Moulding materials according to claim 1, containing, in addition, at least one additive selected from stabilizers, pigments, mould release agents, flame retarding agents or antistatic agents.

* * * * *